United States Patent
Gorday et al.

(10) Patent No.: US 7,016,661 B2
(45) Date of Patent: Mar. 21, 2006

(54) MULTI-MODE RECEIVER FOR FREQUENCY ERROR MITIGATION

(75) Inventors: Paul E. Gorday, West Palm Beach, FL (US); Edgar Herbert Callaway, Jr., Boca Raton, FL (US); Frederick L. Martin, Plantation, FL (US); Qicai Shi, Coral Spings, FL (US)

(73) Assignee: Motorola, Inc., Schaumburg, IL (US)

( * ) Notice: Subject to any disclaimer, the term of this patent is extended or adjusted under 35 U.S.C. 154(b) by 118 days.

(21) Appl. No.: 10/683,098

(22) Filed: Oct. 10, 2003

(65) Prior Publication Data

US 2005/0079843 A1    Apr. 14, 2005

(51) Int. Cl.
*H04B 1/10*    (2006.01)

(52) U.S. Cl. ...................... 455/309; 455/334; 375/324; 329/316

(58) Field of Classification Search ................ 455/334, 455/192.2, 296, 254, 309, 303; 375/324, 375/326, 349; 327/233, 41; 329/316, 318
See application file for complete search history.

(56) References Cited

U.S. PATENT DOCUMENTS

| 5,497,400 | A  |   | 3/1996  | Carson et al. |
|-----------|----|---|---------|---------------|
| 5,727,027 | A  | * | 3/1998  | Tsuda .......................... 375/329 |
| 5,818,882 | A  | * | 10/1998 | Komatsu ..................... 375/344 |
| 6,263,031 | B1 | * | 7/2001  | Beidas et al. ................ 375/343 |
| 6,356,581 | B1 | * | 3/2002  | Nguyen et al. ............. 375/148 |
| 6,721,371 | B1 | * | 4/2004  | Barham et al. .............. 375/316 |
| 6,795,509 | B1 | * | 9/2004  | Yamamoto et al. ......... 375/267 |
| 2004/0114697 | A1 | * | 6/2004 | Young .......................... 375/350 |
| 2004/0218699 | A1 | * | 11/2004 | Carsello ..................... 375/343 |

* cited by examiner

*Primary Examiner*—Edward F. Urban
*Assistant Examiner*—Blane J. Jackson

(57) ABSTRACT

The present invention provides a multimode receiver design for mitigation of frequency offset by selective demodulation of an input modulated signal. The receiver (103) comprises a plurality of demodulators (207). Each of the plurality of demodulators (207) has the same functionality but different receiver sensitivity versus frequency-offset mitigation characteristics. Each of these demodulators incorporates a different demodulation technique. A suitable demodulator is selected to demodulate the received signal. The choice of a suitable demodulator is based on the value of the frequency offset (305, 307).

7 Claims, 4 Drawing Sheets

MULTI-MODE RECEIVER FOR FREQUENCY ERROR MITIGATION

FIELD OF THE INVENTION

The present invention relates to the field of data communication in a wireless environment. More specifically, it relates to a method and system for demodulation of data at the receiver end. The invention may also be extended to wireline systems employing bandpass communications in which information is modulated onto a carrier wave prior to transmission across a physical medium.

BACKGROUND

Over the past few decades, there have been significant advancements in the field of wireless communication. Wireless technology has found applications in a variety of areas such as telephony, control of industrial devices, entertainment and many more. Some common examples of wireless communication systems include mobile phones, cordless phones, pagers, and wireless LANs.

Wireless communication systems typically involve the use of transmitters and receivers for the transmission and the reception of data signals respectively. The data signal is embedded in a carrier wave. The carrier wave is typically a sinusoid whose oscillation frequency is referred to as the carrier frequency. The carrier wave is modulated at the transmitting end according to the characteristics of the data signal. During modulation, a particular characteristic, like amplitude or frequency, of the carrier wave is varied according to the data signal. The carrier wave, which is modulated using the data signals, is termed as a modulated carrier wave. The modulated carrier wave is demodulated at the receiver end to recover the original data signals. Thus, the data signals are exchanged between the transmitter and the receiver.

For effective exchange of data signals in a wireless communications system, it is imperative that both the transmitter and the receiver operate at the same carrier frequency. Consistency of frequency is ensured by using frequency references in devices such as transmitters and receivers. A frequency reference is an oscillator that produces a standard frequency, from which the operating frequencies of the receiver and the transmitter are derived. Typically, a frequency reference is implemented using a piezo-electric crystal. Other types of frequency references, including those constructed of integrated circuit elements such as resistors, inductors and capacitors, tend to be less accurate and less expensive than crystal-based references. In general, the reference elements in the transmitter and the receiver are different and produce slightly different frequencies. Even if the transmitter and the receiver reference elements are of similar design, they may produce different frequencies or vary over time due to manufacturing variation and environmental factors such as temperature, vibration, and aging. This leads to a mismatch between the carrier frequencies at which the transmitter and the receiver operate. This mismatch is termed as frequency offset. The frequency offset between the transmitter and the receiver is a major hindrance in achieving efficient exchange of data signals between the two devices. The effect of this frequency offset needs to be minimized in order to improve the quality of wireless communication. This is known as frequency offset mitigation. The frequency offset mitigation is achieved without affecting the value of the frequency offset.

A number of approaches exist in the art for mitigation of the frequency offset. One such method involves use of a suitable demodulation technique that can mitigate the largest expected frequency offset. The demodulator, using this demodulation technique, carries out demodulation without reducing the frequency offset.

There exist a number of techniques dealing with the frequency offset in wireless communication. U.S. Pat. No. 5,497,400, titled "Signal receiver and method of compensating frequency offset", assigned to Motorola, Inc., describes a decision feedback demodulator. The decision feedback demodulator is used to extract data from a received signal. The decision feedback demodulator mitigates the frequency and the phase error by rotating the phase of the received signal. The amount of phase rotation is determined with the help of prior phase rotation values.

The techniques discussed above utilize a single demodulator. The use of a single demodulator for all cases of frequency offset results in a cost versus sensitivity tradeoff. A demodulator incorporating a specific demodulation technique has its specific cost and sensitivity value. Whenever the demodulator is used to demodulate a signal, the specific cost is incurred and the specific sensitivity level is achieved. The cost incurred is higher for achieving higher levels of sensitivity. However, the demodulator may be used for a wide range of applications requiring different levels of cost and sensitivity. Hence, the cost incurred may be higher than necessary for applications that can tolerate poorer sensitivity than that provided by the demodulator. Alternatively, applications requiring very good sensitivity will be affected due to poor sensitivity provided by a low cost demodulator. Applications requiring good sensitivity are those that require a high distance separation level such as agricultural monitoring applications. In such cases, higher cost receiver devices incorporating demodulation techniques providing better sensitivity will be a cost effective trade-off because fewer devices will be needed to cover a given geographical area. On the other hand, applications such as a wireless computer mouse or keyboard operate over very short distances and do not require good receiver sensitivity. In this case using a low-cost, low-stability receiver device is appropriate.

From the above discussion, it is evident that there exists a need for a receiver that provides customized frequency offset mitigation. A need also exists for a single receiver that can accommodate a variety of applications, the applications requiring different cost versus sensitivity attributes. The receiver should provide a level of cost and sensitivity best suitable to the application as per its requirements.

SUMMARY

The present invention provides a wireless receiver for frequency offset mitigation of a received signal. The receiver comprises multiple demodulators, each demodulator incorporating a different demodulation technique. Multiple demodulators are required in order to mitigate different values of the frequency offset. The received signal is demodulated by a suitable demodulator from amongst the multiple demodulators. The suitable demodulator is chosen depending upon the value of the frequency offset. Since the value of the frequency offset is related to the cost of the receiver, primarily through the choice of frequency reference element, selecting a demodulator based on the frequency offset allows the receiver to optimize its sensitivity for a given cost.

BRIEF DESCRIPTION OF THE DRAWINGS

The various embodiments of the invention will hereinafter be described in conjunction with the appended drawings provided to illustrate and not to limit the invention, wherein like designations denote like elements, and in which.

DESCRIPTION OF PREFERRED EMBODIMENTS

For convenience, terms that have been used in the description of various embodiments have been defined below. It is to be noted that these definitions are given merely to aid the understanding of the description, and that they are, in no way, to be construed as limiting the scope of the invention.

Modulation: Modulation is the process of adding data to be transferred onto a carrier wave.

Demodulation: Demodulation is the inverse of modulation. It refers to the process of extracting data from a received modulated signal.

Demodulator: A demodulator is a device that carries out the process of demodulation.

Frequency offset: Frequency offset is the difference between the carrier frequencies of two devices that are trying to exchange data between themselves.

Receiver sensitivity: Receiver sensitivity refers to the lowest signal power level at which a receiver can reliably receive a signal in the presence of noise and disturbances.

Demodulation scheme: Demodulation scheme is an algorithm adopted by a demodulator to demodulate a received modulated signal.

The present invention discloses a method and system for selective demodulation of a received signal in a wireless environment. The system comprises a wireless receiver that consists of multiple demodulators. The demodulators have the same functionality but different sensitivity versus frequency-offset mitigation characteristics. Depending upon the level of the frequency offset between the transmitter and the receiver, a suitable demodulator is selected to demodulate the received signal.

The present invention is applicable to a variety of applications, herein the effect of the frequency offset needs to be mitigated. The applications to which the present invention may be applied include, but are not limited to, wireless personal area network, home automation, control and monitoring of industrial equipment, asset location and tracking (e.g., inside stores and warehouses), intelligent agriculture (the monitoring of agricultural sensors, such as moisture sensors), toys, medical devices, and security systems.

Figure 1:
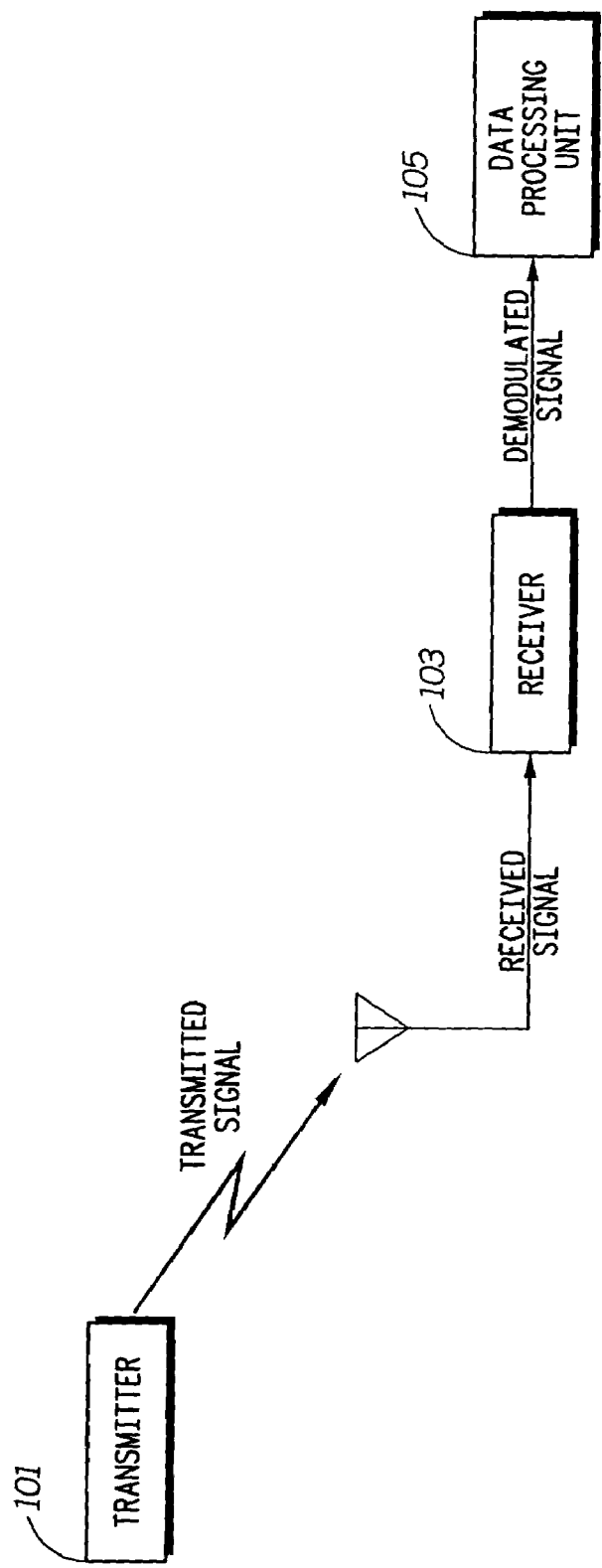
FIG. 1 is a block diagram of the environment in which the present invention works, in accordance with an embodiment of the present invention.

FIG. 1 is a block diagram of the environment in which the present invention operates in accordance with an embodiment of the present invention. FIG. 1 shows a transmitter 101, a receiver 103 and a data processing unit 105. Transmitter 101 transmits a modulated data signal. The data signal is received as an input to receiver 103. Receiver 103 typically amplifies the received signal and converts it to a convenient intermediate frequency (IF) or to baseband for demodulation. Alternatively, the received signal may be demodulated directly without conversion. The demodulated signal is then sent to data processing unit 105. Data processing unit 105 refers to an application device that further uses the demodulated signal. Data processing unit 105 processes the demodulated signal according to the desired end objective of the receiver application. Examples of data processing unit include wireless sensors, automation devices, remote controls, memory for stored information and the like. It may be noted that although only one transmitter is shown in FIG. 1, there can be multiple transmitters in the environment that can communicate with receiver 103. The value of the frequency offset for a communication session would thus be dependent on the carrier frequencies of the receiver and the active transmitter. Also, it is recognized that transmitter 101 and receiver 103 may be parts of separate transceiver devices used for two-way communications.

Figure 2:
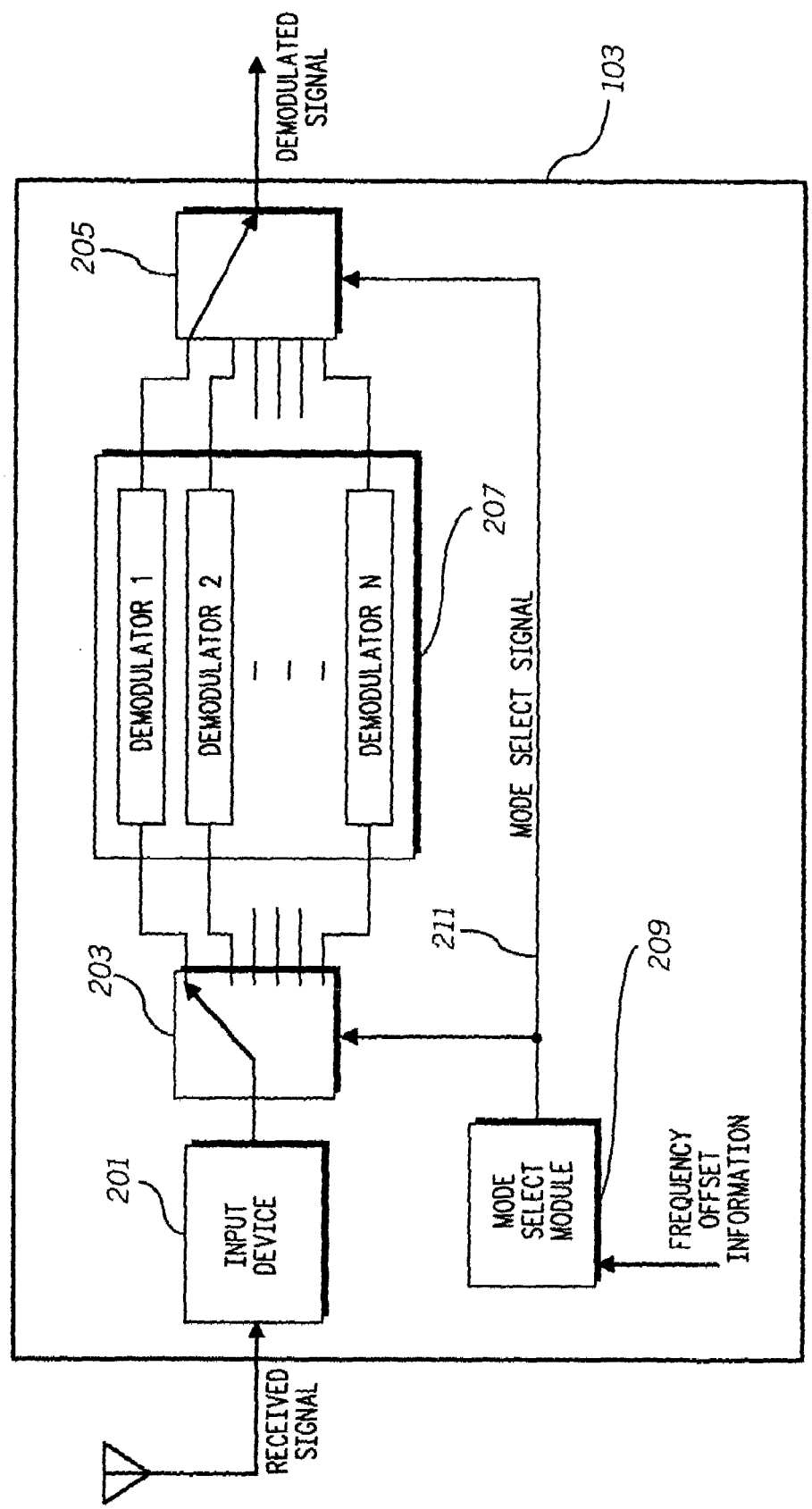
FIG. 2 is a block diagram illustrating the wireless receiver that carries out selective demodulation of the received signal in accordance with an embodiment of the present invention.

FIG. 2 is a block diagram of receiver 103 that is used for selective demodulation in accordance with an embodiment of the present invention. Receiver 103 comprises an input device 201, a first selector 203, a second selector 205, a demodulator device 207 and a mode select module 209. Demodulator device 207 comprises a plurality of demodulators. These demodulators provide options for receiver 103 to optimize its sensitivity by choosing an appropriate demodulator based on the required performance characteristics. For example, for a given modulation format of the received signal, such as Offset Quadrature Phase Shift Keying (OQPSK), the receiver may use coherent, non-coherent, or differentially coherent demodulation techniques, wherein each technique provides different tradeoffs in terms of frequency offset mitigation and receiver sensitivity.

Input device 201 typically amplifies the received signal and converts it from the carrier frequency to an intermediate frequency (IF) or to baseband for demodulation. The amplified signal is then sent to first selector 203. First selector 203 may be implemented as analog switching circuitry, a digital demultiplexer, conditional software commands and the like. Another input to first selector 203 and second selector 205 is a mode select signal 211 from mode select module 209. The input to mode select module 209 is the frequency offset information and the output is the mode select signal 211. Frequency offset information is the value of the frequency offset between the transmitter and the receiver.

The value of the frequency offset depends on the type of frequency reference used by the transmitter and the receiver, the effect of manufacturing variations and environmental factors such as temperature, vibration and aging on the frequency reference. For applications requiring higher sensitivity, the quality of frequency reference used is of superior type and hence the frequency offset value is low. Alternatively, for lower sensitivity applications, inferior quality devices are used. This results in higher values of the frequency offset.

Mode select module 209 determines the suitable demodulator from demodulator device 207 on the basis of the frequency offset value. Mode select module 209 may be implemented as a memory device, which stores a programmable mode value. The memory device may be RAM, ROM, or discrete registers (flip-flops) within receiver 103. In an embodiment of the present invention, the mode selection may be based on the expected value of the frequency offset, as determined by the design or standard specifications for frequency stability. In this case, the manufacturer, application provider, or the user may program the memory device. In another embodiment of the present invention, the mode selection may be based on the measured or acquired value of the frequency offset. In this case, receiver 103 may program the memory device and mode select module 209 may include circuitry or software to map the measured frequency offset or acquired frequency stability information into a demodulator mode value. The mode select signal is an indication of the demodulator to be chosen corresponding to the value of the frequency offset. Thus, the demodulator providing the best sensitivity characteristics is used for a signal having minimum frequency offset and vice-versa. This provides an effective optimization between the cost and sensitivity requirements of an application.

The demodulators in demodulator device 207 have the same functionality but different sensitivity versus frequency-offset mitigation characteristics. Thus, each demodulator in demodulator device 207 applies a different demodulation technique to demodulate a single modulation format, such as Offset Quadrature Phase Shift Keying (OQPSK). Examples of demodulation techniques include coherent detection, non-coherent detection, and differentially coherent detection. These examples are only for illustrative purposes and do not limit the scope of the present invention. It may be apparent to any person skilled in the art that many other demodulation techniques may be used without deviating from the spirit of the present invention.

Depending upon the mode select signal, first selector 203 connects the amplified signal received from input device 201 to a suitable demodulator in demodulator device 207. The amplified signal is then demodulated by the suitable demodulator. Thereafter, the demodulated signal is sent to second selector 205. Second selector 205 connects the demodulated signal from the suitable demodulator to data processing unit 105. First selector 203 and second selector 205 may be implemented using analog switching circuitry, digital multiplexer, conditional software commands, or the like, depending on the demodulator implementation.

In another embodiment of the present invention, first selector 203 may be replaced with a signal splitter, which routes the amplified signal to all demodulators in demodulator device 207. In this embodiment, demodulator selection is accomplished using second selector 205, which passes the desired demodulator output to the data processing unit. In yet another embodiment, second selector 205 may be replaced by a signal combiner, which simply sums the outputs of all the demodulators and passes the result to the data processing unit. In this embodiment, demodulator selection is accomplished with first selector 203, and the output of the non-selected demodulators would be zero, thereby having no influence on the summing, or combining operation.

Figure 3:
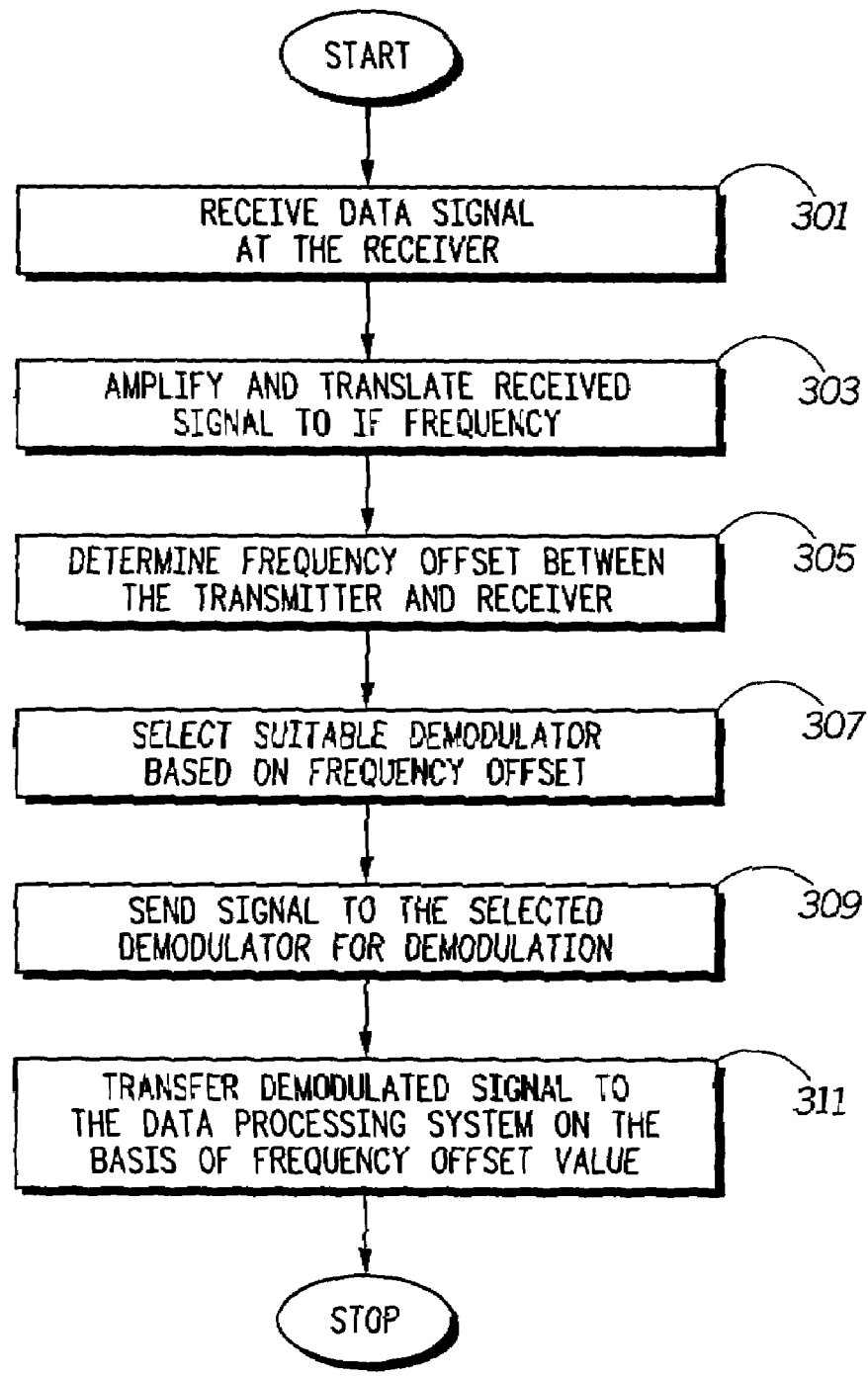
FIG. 3 is a flowchart that describes the method by which the received signal is demodulated in accordance with an embodiment of the present invention.

FIG. 3 is a flowchart of the steps involved in selective demodulation in accordance with one embodiment of the disclosed method. At step 301, receiver 103 receives the data signal to be demodulated. The received signal is then amplified and converted to an intermediate frequency (IF) at step 303. At step 305, the frequency offset between the transmitter and the receiver is determined. The frequency offset can be determined with the help of methods existing in the art. A few such methods have been described in detail later. Based on the value of the frequency offset, a suitable demodulator is selected at step 307. At step 309, the received signal is sent to the selected demodulator for demodulation. At step 311, the output side of the suitable demodulator is connected to a data processing unit. Hence, the demodulated signal is transferred to the data processing unit.

As described above, the measured or expected value of the frequency offset between the transmitter and the receiver is required to select the suitable demodulator. The frequency offset value can be determined by various methods. Some of these methods have been described hereinafter.

According to one of the methods, the frequency offset can be determined from the known (or assumed) frequency stability of the receiver and an assumed value of frequency stability of other transmitting devices in the operating environment of the receiver. Known frequency stability refers to information obtained from manufacturer's design specifications or data sheets. Assumed values of frequency stability may be based on design similarity or compliance requirements for a standard such as IEEE 802.15.4. The frequency stability is typically determined as maximum error from the design frequency over a range of environmental factors such as temperature, vibration and aging. It may also be determined as a curve or table of frequency error versus environmental factors. Given the frequency stability information of the receiver and other transmitting devices in the network, the frequency offset may be computed as the worst-case value, or a value that encompasses an acceptable percentage of all cases.

Alternatively, the frequency offset may be determined from the known or assumed frequency stability of the receiver and acquired information of a specific transmitter's frequency stability. The frequency stability information can be acquired in the form of control information in the transmitted signal. Thus, the receiver may use device specific frequency stability information rather than a network-wide assumption for all devices to determine the frequency offset. Further, a transmitting device may also have stability information of other devices in the system, which the transmitting device may distribute in the form of a list to other devices in the system. An example of this may be a star network, which has a central or master device connected to multiple devices. In case of a star network, the central or the master device may have the frequency stability information about other devices connected to it. The central device may send this information to all the devices connected to it in a data packet. Given the frequency stability information for the receiver and other transmitting devices in the network, the frequency offset may be computed as the worst-case value, or a value that encompasses an acceptable percentage of all cases.

Another method of determining the frequency offset involves measuring the frequency offset at the time of receiving the packet. A synchronization or preamble field is sent to the receiver before sending the actual data packet. The frequency offset may be calculated based on the frequency offset measured during the sending of the synchronization or preamble field. Otherwise, a special synchronization packet may be sent in order to determine the frequency offset.

In addition to the above methods of determining the frequency offset information, the present invention also allows for indirect estimation of the frequency offset. In this method, the available demodulators are used sequentially or simultaneously to demodulate part of the received signal such as a preamble field prior to the data field. Similarly, a preamble or training packet could be sent prior to the data packet. A signal quality estimation block is attached at the output of all the demodulators. The signal quality estimation block estimates the performance of each of the demodulators using measures such as output signal-to-noise ratio, symbol confidence values, symbol error rate, or data error detection. The demodulator producing the best result is chosen for further demodulation of the data portion of the signal.

Figure 4:
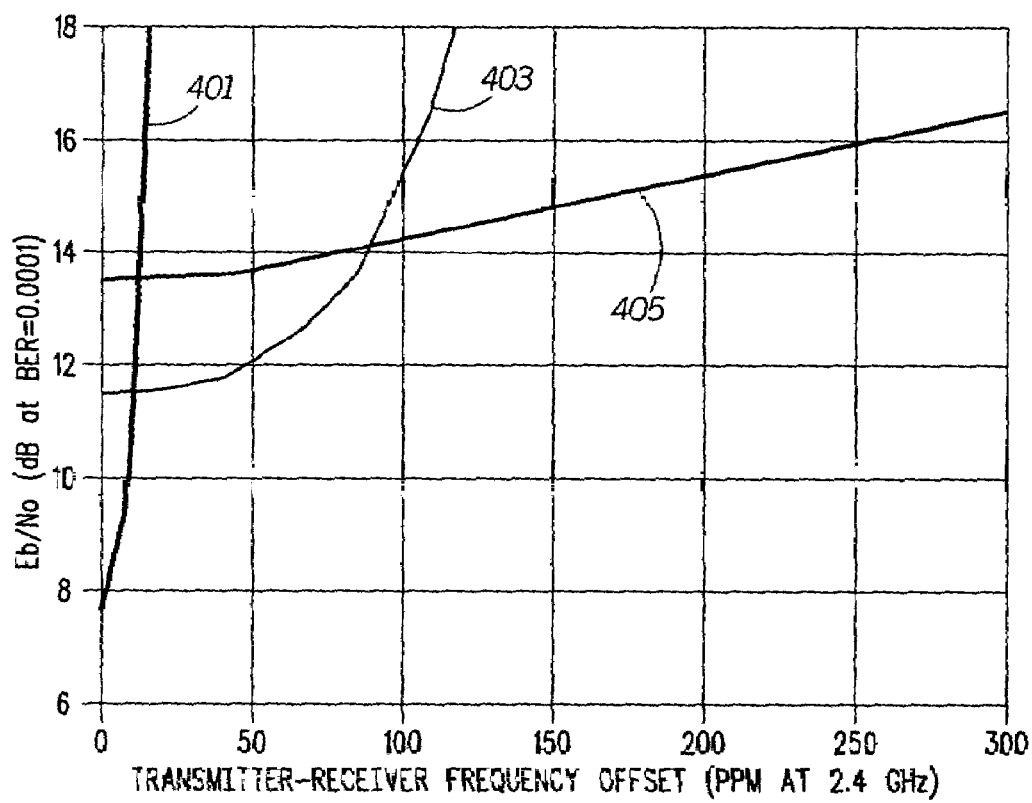
FIG. 4 is a graphical representation of the performance of three different demodulation techniques vis-a-vis the frequency offset versus noise characteristics of a data signal in accordance with an embodiment of the present invention.

FIG. 4 is a graphical representation of the performance of three different demodulation techniques in terms of the frequency offset versus noise characteristics of a data signal, in accordance with an embodiment of the present invention. The horizontal axis in the graph represents the frequency offset between the transmitter and the receiver. The frequency offset is expressed in units of parts per million (ppm) at 2.4 Giga Hertz (GHz). This is defined as the frequency offset in Hz divided by 2.4 GHz, and multiplied by one million. The vertical axis represents the signal-to-noise ratio at the demodulator inputs that is required to achieve a given bit error rate (0.01% in this example). The signal-to-noise ratio is quantified as the average energy per bit in the received signal, divided by the spectral density level of the receiver's thermal noise. A 0.01% bit error rate represents an average of one bit error for every 10000 bits received. The format of the received signal in this example is the standard IEEE 802.15.4 signal format. The IEEE 802.15.4 standard relates to low-rate wireless personal area networks, whose potential applications include areas such as sensors, smart badges, remote control, home automation and the like. FIG. 4 shows first a curve 401, a second curve 403 and a third curve 405, each corresponding to a specific demodulation technique. The curves represent the balance between noise and frequency offset mitigation corresponding to respective demodulation techniques in case of IEEE 802.15.4 signal format. First curve 401 represents the relationship between the frequency offset and noise levels corresponding to optimum non-coherent demodulation. Second curve 403 corresponds to differential chip detection with coherent correlation, and third curve 405 corresponds to differential chip detection with non-coherent correlation. As depicted in the graph, first curve 401 shows a steep rise in the required signal-to-noise ratio of the received signal over a short range of frequency offset. An increase in the required signal-to-noise ratio is equivalent to a degradation in sensitivity. Second curve 403 shows a more gradual degradation in sensitivity with an increasing frequency offset. Third curve 405 provides the maximum mitigation to frequency offsets, the mitigation comes at the expense of poorer sensitivity, or higher signal-to-noise ratio, for low frequency offsets. Thus, it is evident that there is a substantial difference in the quality of the demodulated signals for three different demodulation techniques for the same signal. The main objective of the graph is to show the effect of different demodulation techniques on the frequency offset. Hence, the present invention with the help of its multiple demodulator design makes it possible to choose an optimum demodulation technique, thereby decreasing the error rate induced by the frequency offset. The demodulation technique is optimized according to the frequency offset, and hence the cost limitations and the application needs.

The present invention may also be extended to wireline systems employing bandpass communication. In this type of communication, the information is modulated onto a carrier wave prior to its transmission. The transmission takes place over a physical medium like copper wire. A number of wireline communication systems, such as telephone modems and cable modems, use bandpass modulation techniques, in which information is modulated onto a carrier. The techniques described in the present invention would help mitigate frequency offsets in these systems as well.

While various embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method in a receiver for mitigating frequency offset between a transmitter and the receiver, the method comprising:
    providing a plurality of demodulators, the plurality of demodulators capable of demodulating a received signal at various levels of frequency offset, each demodulator having a different sensitivity versus frequency offset mitigation characteristic;
    estimating the frequency offset for the receiver;
    selecting a suitable demodulator, the selection being based on the estimated frequency offset;
    demodulating the received signal, the demodulation being carried out by the suitable demodulator;
    wherein estimating the frequency offset comprises calculating a frequency offset value from frequency stability information of the receiver and one or more transmitting devices, the transmitting devices being present in the operating environment of the receive; and
    wherein the calculation determines the worst-case frequency offset between the receiver and the transmitting devices based on their frequency stabilities.

2. The method as recited in claim 1 further comprising amplifying the received signal.

3. The method as recited in claim 1 further comprising converting the frequency of the received signal to an intermediate frequency.

4. The method as recited in claim 1 wherein the frequency stability information of the receiver and the transmitting devices is determined from known device characteristics or operation requirements for a network in which the devices operate.

5. The method as recited in claim 1 wherein the frequency stability information of the transmitter is provided as control information in the received signal.

6. The method as recited in claim 1 wherein estimating the frequency offset comprises measuring, by the receiver, the frequency offset between the transmitter and the receiver during a synchronization signal, the synchronization signal being received by the receiver before receiving the actual data signal.

7. The method as recited in claim 1 wherein selecting the suitable demodulator comprises:
    demodulating a part of the received signal by each demodulator among the plurality of demodulators;
    assessing the demodulated output from each of the plurality of demodulators; and
    selecting a suitable demodulator based on the step of assessing.

* * * * *